US006910113B2

(12) United States Patent
Natu (10) Patent No.: US 6,910,113 B2
(45) Date of Patent: Jun. 21, 2005

(54) EXECUTING LARGE DEVICE FIRMWARE PROGRAMS (75) Inventor: Mahesh S. Natu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 09/948,805

(22) Filed: Sep. 7, 2001

(65) Prior Publication Data

US 2003/0051114 A1 Mar. 13, 2003

(51) Int. Cl.[7] .............................................. G06F 12/00
(52) U.S. Cl. ....................... 711/165; 711/103; 711/154; 711/170; 713/1; 713/2; 710/8; 710/10; 710/62; 710/306
(58) Field of Search .................................. 711/165, 103, 711/154, 170; 713/1, 2; 710/8, 10, 62, 306

(56) References Cited

U.S. PATENT DOCUMENTS

| 5,579,529 | A | * | 11/1996 | Terrell et al. .................. 710/8 |
| 5,598,563 | A | * | 1/1997 | Spies ............................. 713/2 |
| 6,529,989 | B1 | * | 3/2003 | Bashford et al. ........... 710/306 |
| 6,567,911 | B1 | * | 5/2003 | Mahmoud ..................... 713/2 |
| 6,598,159 | B1 | * | 7/2003 | McAlister et al. ............. 713/2 |
| 2003/0005276 | A1 | * | 1/2003 | French et al. .................. 713/2 |
| 2003/0041088 | A1 | * | 2/2003 | Wilson et al. .............. 709/104 |

OTHER PUBLICATIONS

Shanley et al., "PCI System Architecture, 3rd Edition," Chapter 17: Configuration Registers, and Chapter 18:Expansion ROMs, pp 329–378, MindShare, Inc., 1995.*

* cited by examiner

Primary Examiner—Stephen Elmore
(74) Attorney, Agent, or Firm—Trop, Pruner & Hu, P.C.

(57) ABSTRACT

A processor-based system includes a system firmware program (e.g., the system basic input/output system (BIOS)) to execute a device firmware program (e.g., a device driver) stored on a storage device (e.g., an expansion read-only-memory (ROM)). For execution, the processor-based system uses a system memory including a designated region intended for storing the device firmware program. The system firmware program determines whether the device firmware program exceeds the capacity of the designated region. And, if so, the system firmware program stores the device firmware program in the designated region and at least one another location in the system memory thus supporting larger expansion ROMs on some platforms.

28 Claims, 6 Drawing Sheets

EXECUTING LARGE DEVICE FIRMWARE PROGRAMS

BACKGROUND

This invention relates to Basic Input/Output System (BIOS) operations and, more particularly, to executing large device firmware programs including device drivers, such as those stored in a read-only memory (ROM).

The BIOS is a firmware-resident program that initializes a platform following power-on or reset operations. Various components of the platform are initialized, one by one, after which the operating system is booted. The BIOS is stored on a firmware device such as a read-only memory (ROM), erasable program ROM (EPROM), or a flash memory device.

Some components of the system may not be recognized by the BIOS. Some hardware devices, for example, are controlled by a non-BIOS program stored on an expansion ROM, also known as an option ROM.

For some platforms, i.e., those which support Intel architecture processors, or those which are advanced-technology (AT)- or extended-technology (XT)-compatible, the BIOS is addressed at a memory region between 0xe0000 and 0xfffff. Likewise, expansion ROMs are addressed somewhere between 0xc0000 and 0xe0000, a 128K "compatibility" region. Regardless of the architecture, however, the expansion ROMs must be located in certain designated memory range or region due to compatibility reasons.

Typically, such platforms include a 32K expansion ROM dedicated wholly to supporting a video card. Of the original 128K, just 96K of the expansion ROM space is available for other expansion ROMs.

As new hardware features are supported or as hardware devices become more complex, the size of expansion ROMs tend to increase. For example, a single expansion ROM image may be expected to support many variations of the hardware. Therefore, an expansion ROM image may ideally implement a variety of desired new hardware features that take advantage of the latest hardware without needing removal of existing or older versions of code. In addition, the expansion ROM is desired to be backward compatible and platform independent.

In recognition of the limited space available for expansion ROMs, the Peripheral Component Interconnect (PCI) Bus Specification, Version 2.0, for one, introduced a mechanism for maximizing the use of space. The PCI Specification is available from The PCI Special Interest Group, Portland, Oreg. 97214. Under PCI 2.0, expansion ROMs are divided into initialization and runtime portions, although packaged into a single binary image. The initialization portion is executed, and subsequently discarded, while the runtime portion is maintained in the 128K expansion ROM region. In essence, the size of the expansion ROM stored in the expansion ROM region shrinks following initialization. However, increasingly enhanced expansion ROM support within the BIOS is desired.

Unfortunately, expansion ROMs have attained sizes of 80K to 90K and higher. Further, the ratio of initialization code to runtime code has increased, rendering the above solution impractical, in some environments. Where the initialization portion of the expansion ROM cannot be loaded into the designated expansion ROM memory, the fact that the expansion ROM shrinks following initialization is irrelevant.

Thus, there is a continuing need to support larger expansion ROMs on some platforms.

DETAILED DESCRIPTION

Figure 1:
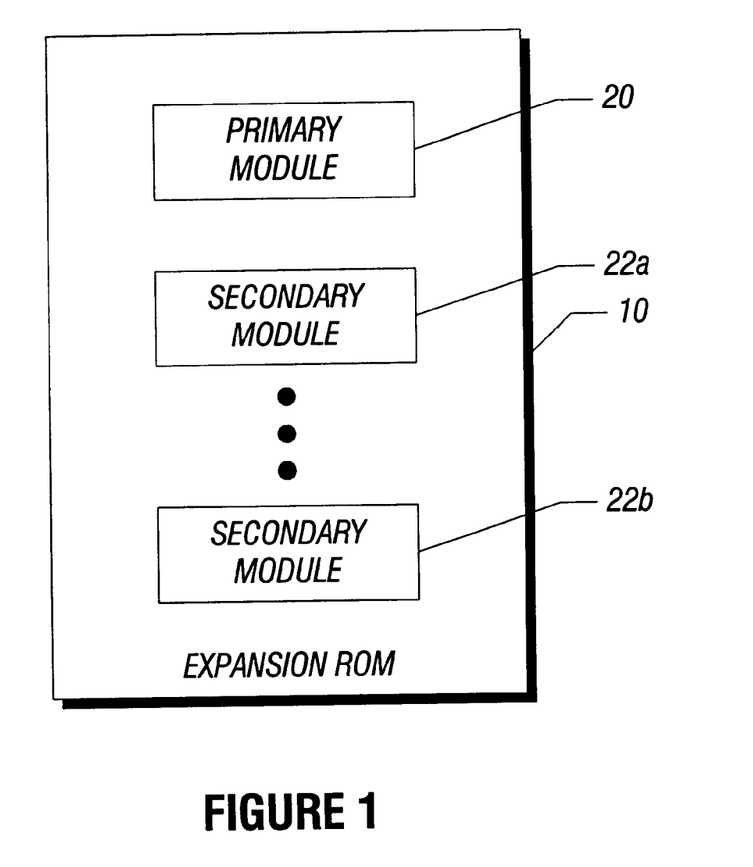
FIG. 1 is a block diagram of an expansion ROM according to one embodiment of the invention.

In FIG. 1, an expansion ROM 10 includes a primary module 20 and one or more secondary modules 22. The primary module 20 includes executable code that initializes or otherwise prepares the device supported by the expansion ROM 10. At power on of a processor-based system, a system BIOS will pass control to the primary module 20, as if the primary module were the entire expansion ROM.

The secondary modules 22 include code and/or data that support the primary module during initialization. For example, one secondary module may include code such as a configuration utility. Another secondary module may, for example, include data such as error message strings. In one embodiment, the secondary modules will not be loaded into the expansion ROM region of memory.

Figure 2:
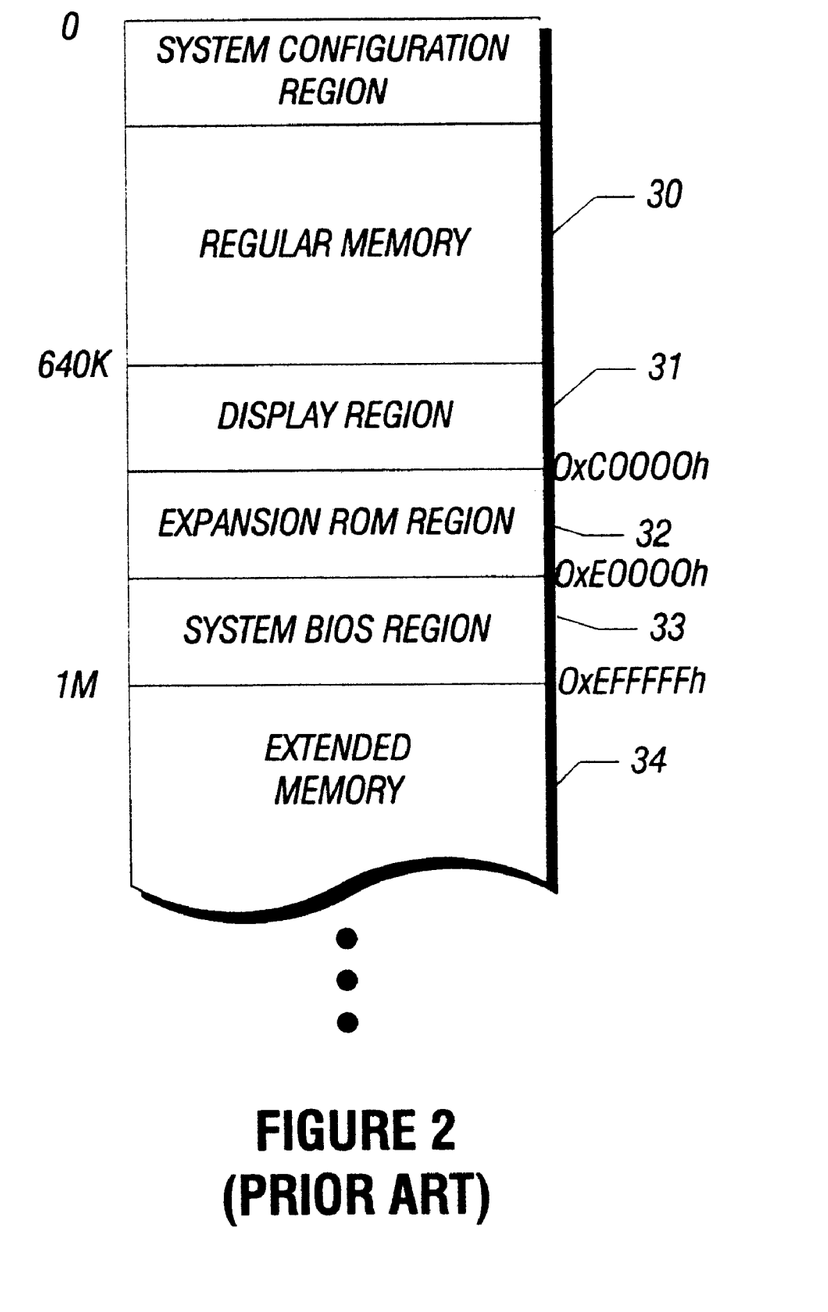
FIG. 2 is a memory map for an AT-compatible system according to one embodiment of the invention.

A memory map for systems that use Intel architecture processors is depicted in FIG. 2. A region below 640K is known as regular memory 30. At the bottom of regular memory is a system configuration region. The system configuration region includes pointers to interrupt addresses and configuration variables. Executable programs or data may be loaded into the regular memory 30.

Between 640K and 1M are regions reserved for various system functions. The first 128K is a display region 31, to which video data is sent such that the data may be viewable on a monitor. The next 128K region is an expansion ROM region 32. This region is addressed between 0xc000h and 0xe000h. Any expansion ROMs that are supported by the system may be stored in the expansion ROM region 32. The remaining 128K, just below 1M, is a system BIOS region 33. It is here that the processor begins executing instructions when power is received to the system.

The remaining region of the memory map is known as extended memory 34.

Typically, the extended memory 34 comprises the majority of memory in this system. Although programs may be loaded into the regular memory 30, more typically, such programs are loaded into extended memory 34.

Returning to FIG. 1, the primary module 20 is loaded into the expansion ROM region 32 in one embodiment. Recall that the expansion ROM region 32 also is reserved for a 32K video ROM. That leaves 96K available for expansion ROMs to be loaded in that embodiment. Increasingly, the expansion ROM region 32 is insufficient in size to support many expansion ROMs.

However, according to one embodiment, the entire expansion ROM 10 of FIG. 1 is not stored in the expansion ROM region 32. Instead, only the primary module 20 is stored in the expansion ROM region 32. The secondary modules 22 may be stored either in the regular memory 30 or the extended memory 34. These operations may be performed by a system BIOS on system ROM 100 (see FIG. 5) in one embodiment.

Figure 5:
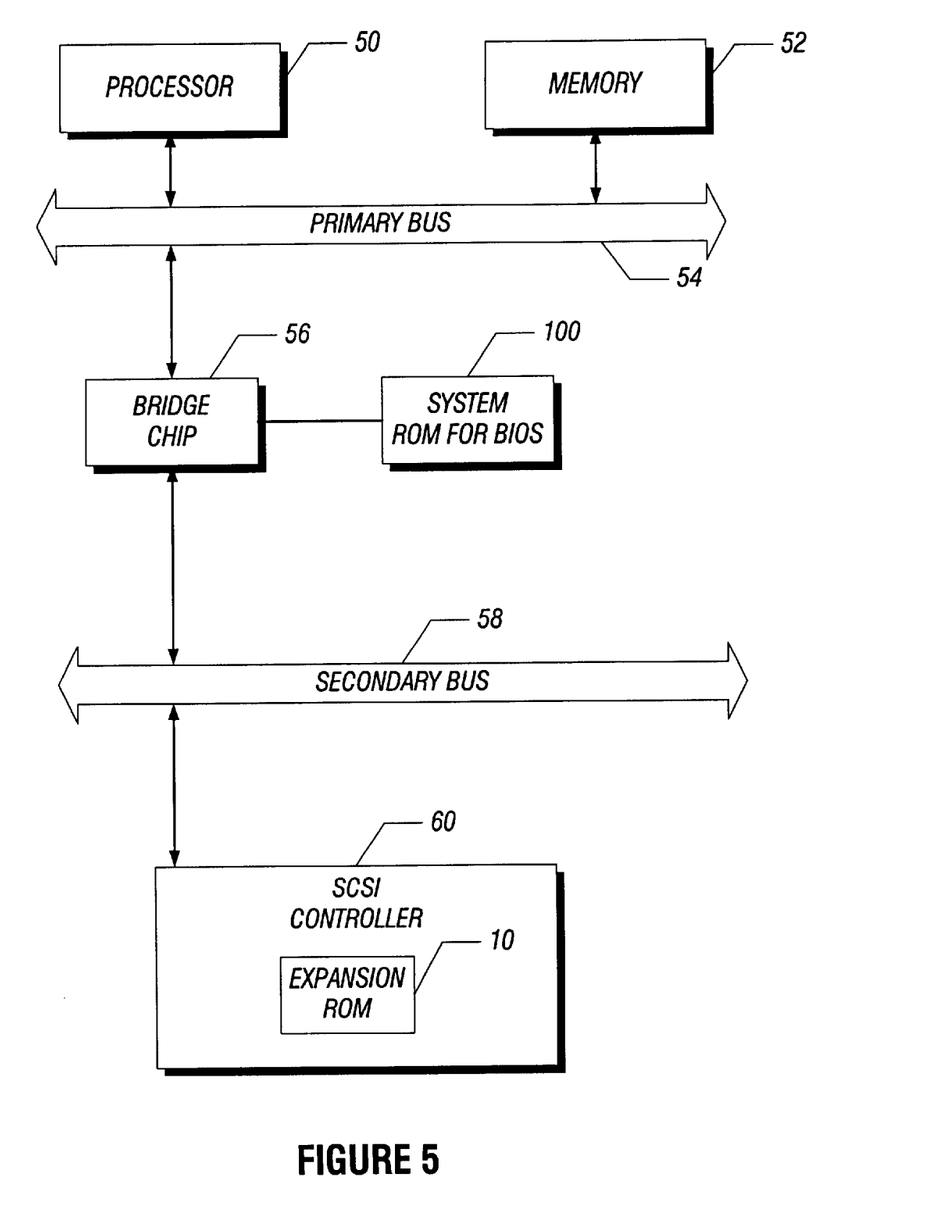
FIG. 5 is a component block diagram of a processor-based system using the expansion ROM of FIG. 1 according to one embodiment of the invention.

In one embodiment, each of the secondary modules 22 in the expansion ROM is identified by type. For example, one secondary module 22A may be of type data while a second secondary module 22B may be of type code. In one embodiment, the system BIOS on system ROM 100 copies secondary modules of type data into the extended memory 32 while copying secondary modules of type code into the regular memory 30. While the primary module 20 is executing from the expansion ROM region 32, it may access the secondary modules stored in either the regular memory 30 or in the extended memory 34.

Normally, extended memory 34 may not be accessed by the system BIOS on system ROM 100 during power-on. Instead, the extended memory 34 is accessible once the operating system has been loaded and run. The extended memory 34 may be accessed during power-on if the system BIOS on system ROM 100 goes into protected mode. Once in protected mode, code that is stored in the extended memory 34 may be executed. Once the execution is complete, control returns to the system BIOS on system ROM 100 and the system ROM returns to real mode.

Alternatively, the system BIOS on system ROM 100 may enter "big real mode."Big real mode allows the system BIOS on system ROM 100 to access data in the extended memory 34 without having to go into protected mode. Accordingly, by storing secondary modules 22, which contain data, in the extended memory 34, the primary module 20 in the expansion ROM region 32 still has access to the secondary modules 22.

In one embodiment, a program or an executable code unit (e.g., a system firmware program 60 of FIG. 4A or a system BIOS 95 of FIG. 4B) creates a base post memory management (PMM) handle for all the secondary modules 22 of the expansion ROM 10. PMM means post memory management where POST means power-on self-test.

Figure 3A:
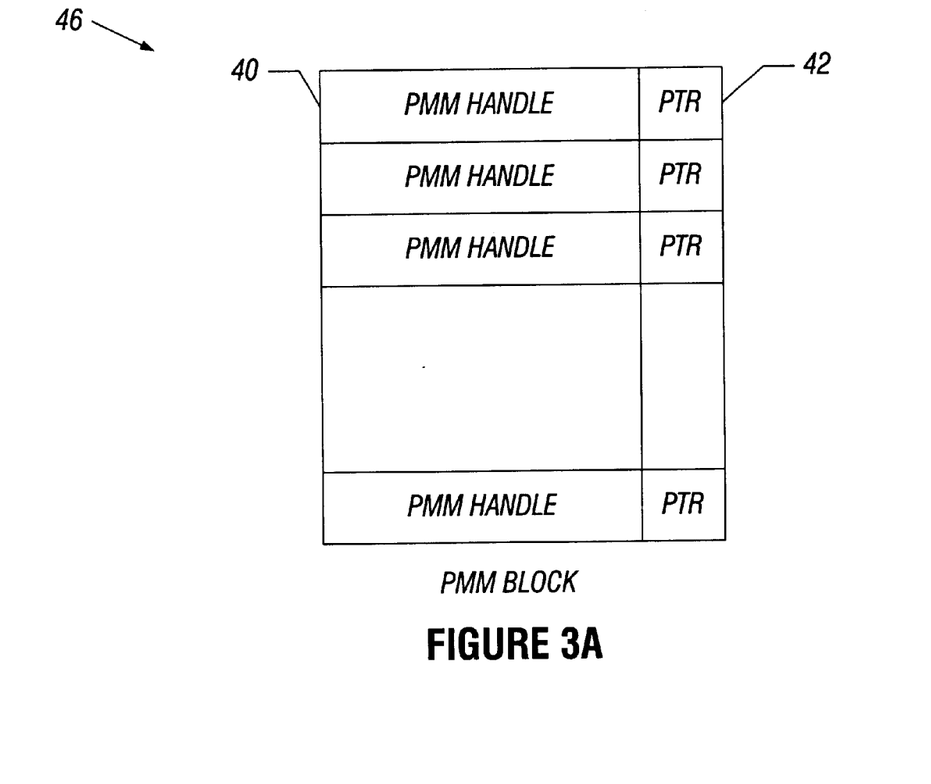
FIGS. 3A and 3B are block diagrams of a PMM block and a PMM handle according to one embodiment of the invention.
Figure 3B:
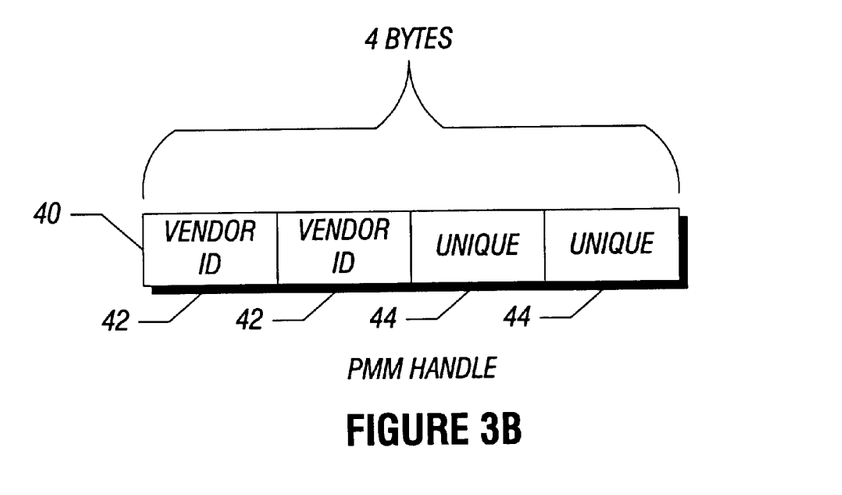

A PMM block 46 according to one embodiment is depicted in FIG. 3A. The PMM block 46 includes a plurality of PMM handles, coupled with pointers (PTRs) 42 to a location in memory. In one embodiment, the system firmware program 60 (FIG. 4A) or the system BIOS 95 (FIG. 4B) uses the PMM handle 40 to pass addresses of the secondary modules 22 to the primary module 20. The PMM handle 40, according to one embodiment, is depicted in FIG. 3B. The upper two bytes of the PMM handle may store a vendor identifier (ID) 42 in one embodiment. The vendor ID 42 is the identifier of the controller that is supported by the expansion ROM 10. Accordingly, both primary module 20 and the secondary modules 22 ideally may have the same vendor ID 42. The lower two bytes 44 are unique for each module. The unique bytes 44 may be chosen either by the system firmware program 60 (FIG. 4A) or the system BIOS 95 (FIG. 4B) and insure that the unique bytes 44 do not conflict with another PMM handle. In one embodiment, the primary module 22 knows the vendor ID 42 of a controller (FIG. 5) and therefore, searches for a PMM handle for each of the secondary modules 22.

The PMM handle 40 is but one of many possible ways to identify where the secondary modules 22 are stored in memory. Those of ordinary skill in the art will recognize a number of ways in which the secondary modules 22 may be kept track of by the primary module 20 and either by the system firmware program 60 (FIG. 4A) or the system BIOS 95 (FIG. 4B).

Figure 4A:
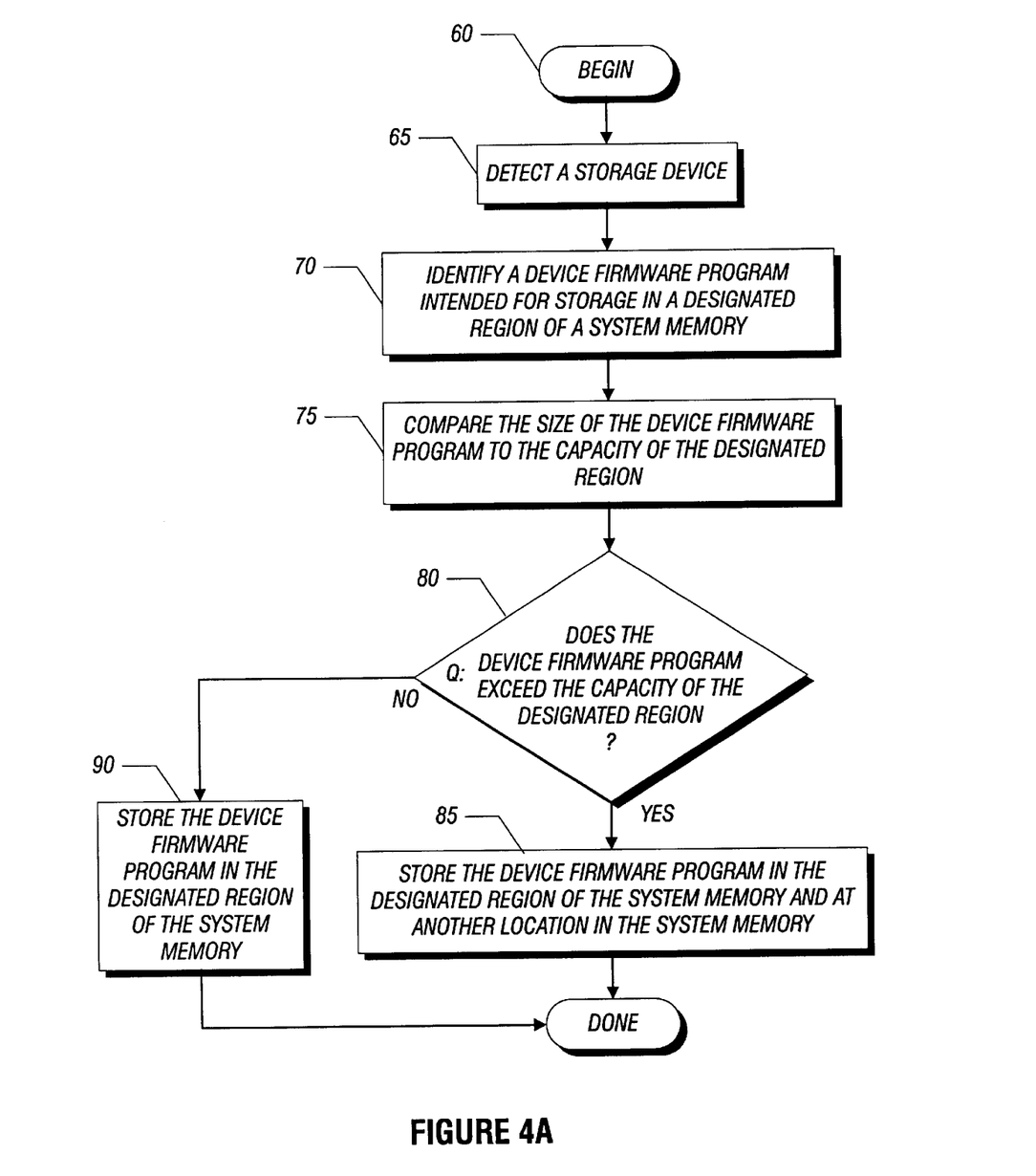
FIG. 4A is a flow diagram illustrating operation of a system firmware program according to one embodiment of the invention.
Figure 4B:
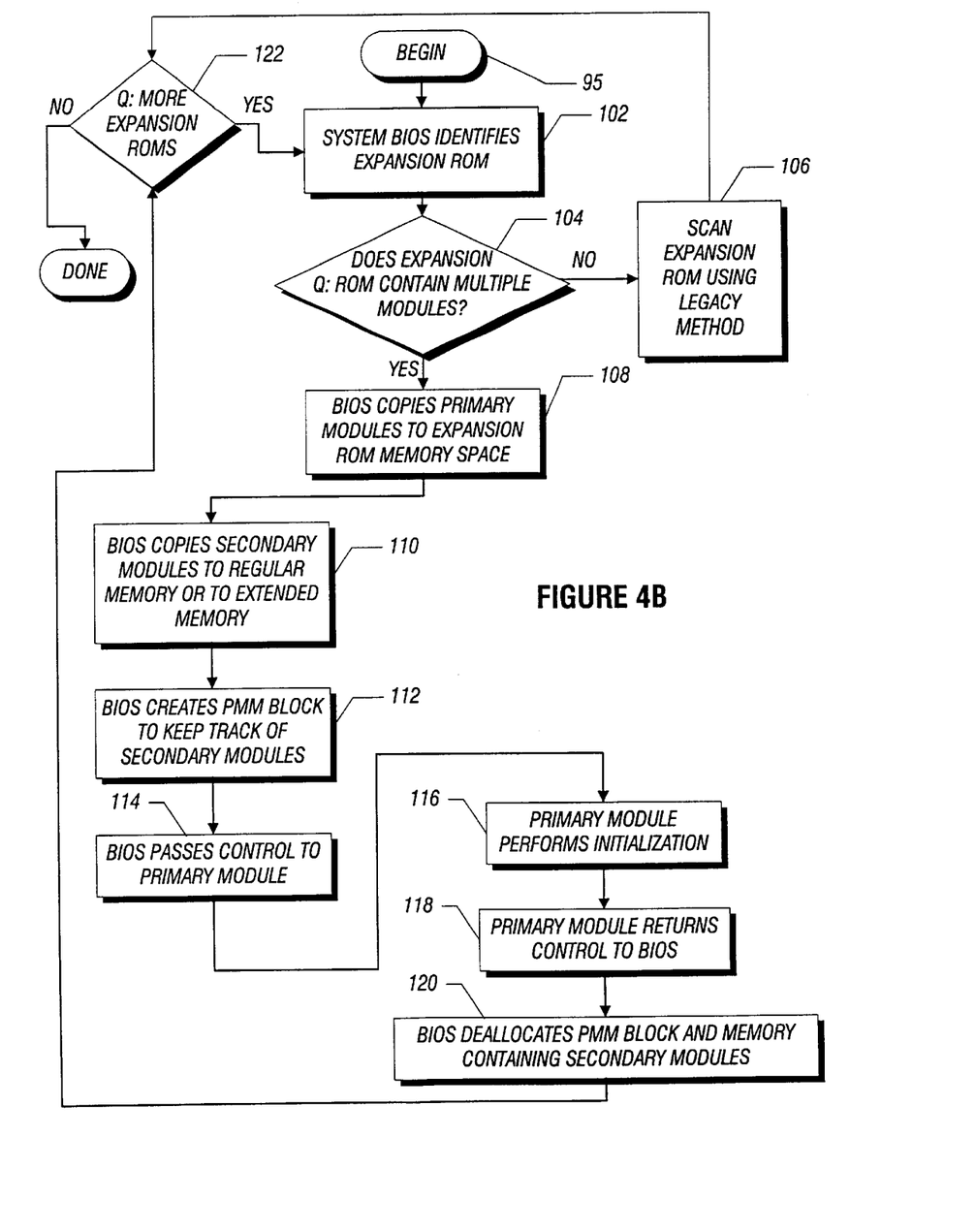
FIG. 4B is a flow diagram illustrating operation of the system BIOS according to one embodiment of the invention.

One operation for executing the expansion ROM of FIG. 1 is depicted in FIG. 4A according to one embodiment. At some point during initialization, the system firmware program 60 (e.g., system BIOS) detects a storage (e.g., a flash device) (block 65). A device firmware program, (e.g., code and/or data on the expansion ROM 10 (FIG. 1)) intended for storage in a designated region, such as the expansion ROM region 32 (FIG. 2) of a system memory may be identified (block 70). In one embodiment, the storage may be located on a hardware device such as, a card or a controller coupled to a motherboard. The hardware device may not be able to initialize independently. To this end, the hardware device includes the storage that, in turn, contains the device firmware program associated with the hardware device. In this way, the system firmware program 60 for appropriate initialization of the hardware device may invoke the device firmware program. For instance, in embedded devices (e.g., a small computer systems interface (SCSI) controller (FIG. 5) on a motherboard), the expansion ROM 10 code may be located in the same ROM chip, i.e., with the system BIOS on the system ROM 100 (FIG. 5).

In operation, the system firmware program 60 may compare the size of the device firmware program against the size or capacity of the designated region (block 75). Essentially, the system firmware program 60 determines whether the expansion ROM 10 includes multiple modules (diamond 80). A check at the diamond 80 indicates whether the size of the device firmware program is less than the size of the designated region. If the check is affirmative, independently executable portions (e.g., the primary module 20 and the secondary modules 22 of FIG. 1) of the device firmware program may be partially stored in the designated region of the system memory and the rest of the device firmware program may be stored at another location in the system memory (block 85). Conversely, if the check fails, the whole device firmware program would have been loaded into the designated region of the system memory (block 90).

In one embodiment, the system firmware program 60 may automatically determine whether the storage (e.g., expansion ROM 10 of FIG. 1) includes at least two modules associated with the device firmware program. The two modules may include a first module (e.g., primary module 20 of FIG. 1) and one or more second modules (e.g., secondary module 22 of FIG. 1), according to one embodiment of the present invention. In such case, only the first module may be loaded in the designated region of the system memory while at least one second module may be copied to the another location in the system memory when initializing a processor-based system from the system firmware program 60.

In one embodiment, a computer system includes a basic input/output system (BIOS), a term that refers to firmware that, when executed, controls various functions (keyboard, disk drives and display screen functions, for example) of the computer system at a basic level. Due to its ability to control the disk drives when the computer system "boots up," the BIOS is responsible for loading the device firmware program (an expansion ROM image, i.e., the program code and parameter space that define the device firmware program) and the operating system. In this manner, the computer system boots up by executing BIOS instructions that cause a loader program to be loaded from a disk drive into system memory. The BIOS may then cause the computer system to execute the loader program that, in turn, causes the computer system to load particular portions of the device firmware program and the operating system into the system memory. Subsequently, the operating system may execute one or more program(s) to initialize and start execution of the operating system.

Furthermore, the expansion ROM image may be stored in a memory that does not lose its stored contents when power to the computer system is removed. For example, the expansion ROM image may be stored in a FLASH memory, an erasable electrically programmable read only memory (EEPROM) that may be rapidly updated. Thus, due to its storage in the FLASH memory, the existing expansion ROM image may be replaced to upgrade the older versions of the expansion ROM image.

Upon booting, the BIOS may detect the expansion ROM image. However, a difficulty with detecting the expansion ROM image is that for some BIOS versions (an older version, for example), the existing expansion ROM image that is stored in the FLASH memory may contain configuration data (boot options and other configuration data, for example) that are specific to a particular BIOS version which may be relatively newer than the existing BIOS version.

According to one embodiment, an expansion ROM image either may be partitioned into multiple modules that are independently identifiable and executable modules (e.g., three modules) or contained in one such single module. However, both types of the expansion ROM images may be included in the expansion ROM 10 as modules one through four. Besides providing for the executability, to independently identify the modules, a configuration indication may be associated with each of the modules of the expansion ROM image including, the primary module 20 and each module of the secondary modules 22. Therefore, when the expansion ROM image is to be loaded into the system memory, for a compatibility check, the configuration indications associated with all of the modules of the expansion ROM image may be checked.

More particularly, while loading the expansion ROM image, in one case where an older version of the BIOS that is unaware of multi-module type of the expansion ROM image, the older version of the BIOS may skip the modules one through three and use the fourth module. Otherwise, for a newer version of the BIOS that allows loading for the expansion ROM image of the multi-module type, modules one through three may be loaded accordingly.

Thus, regardless of the version of the BIOS, both the multi-module and the single module type expansion ROM images may be readily handled. In this manner, a backward compatibility for the expansion ROM images that may have different structures and are governed by different standards may be provided, in one embodiment. As an example, The Peripheral Component Interconnect (PCI) Bus Specification, Version 2.0, available from The PCI Special Interest Group, Portland, Oreg. 97214 provides a standardized approach to an expansion ROM image.

In one embodiment, the system firmware program 60 may partition the device firmware program into the first module and one second module in order to avoid modifications to a standard interface, such as standard application programming interfaces (APIs). Such standard interface may provide communication between the device firmware program and the system firmware program 60. Accordingly, the ability to use the standard interface may provide a platform independent initialization of the processor-based system, in one embodiment. For example, a first image type may be used to describe the secondary modules 22 (FIG. 1) of the expansion ROM 10 (FIG. 1) that comprise code. Likewise, a second image type may be used to describe the secondary modules 22 of the expansion ROM 10 that comprise data. This way, either the system firmware program 60 (FIG. 4A) or the system BIOS 95 (FIG. 4B) may identify these modules and dispatch them to the correct locations in a platform independent manner.

Moreover, based on a location indication, as an example, the PMM handle 40 (FIG. 3B), at least one second module may be loaded into an another location within the system memory. In addition, using the location indication, the processor-based system may dynamically identify the second module to the first module. The location indication may be derived from vendor-identifying information (e.g., vendor ID 42) and module-specific information (e.g., unique bytes 44) that are associated with each of the second module. In this way, the second modules may be tracked based on the location indication.

In one embodiment, the storage (e.g., expansion ROM 10 of FIG. 1) may be scanned to detect a programmed option indicative of one or more expansion read-only-memories 10 (FIG. 1). Each expansion ROM 10 may be scanned to determine whether the first module and one or more second modules are indicated. Then, the control may be passed from the system firmware program 60 to the device firmware program. One or more second modules may be located to initialize the processor-based system based on the one or more expansion read-only-memories detected earlier. Finally, the control may be returned to the system firmware program 60 to boot the processor-based system.

Another operation for executing the expansion ROM of FIG. 1 is depicted in FIG. 4B according to one embodiment. At some point during initialization, the system BIOS 95 identifies the expansion ROM 10 (block 102). The BIOS 95 determines whether the expansion ROM 10 includes multiple modules (diamond 104). If not, the whole expansion ROM 10 would have been loaded into the expansion ROM region 32. Accordingly, the expansion ROM 10 is scanned using legacy methods (block 106). If multiple modules are identified, however, the BIOS 95 copies the primary module 20 to the expansion ROM region 32 (block 108). The BIOS 95 also copies the secondary modules 22 to either the regular memory 30 or the extended memory 34 (block 110). In one embodiment, secondary modules containing data are sent to the extended memory region 34 while secondary modules 22 containing code are copied to the regular memory 30.

In one embodiment, the BIOS 95 creates a PMM block 46 to keep track of where in memory the secondary modules 22 have been loaded (block 112). The BIOS 95 also passes control to the primary module 20 (block 114). Typically, the BIOS 95 passes control to an expansion ROM by jumping to the address where the expansion ROM is located at offset 3, although other mechanisms for passing control to the primary module 20 may be employed. The primary module 20 performs its initialization (block 116). Where the primary module 20 needs access to the secondary modules 22, in one embodiment, the primary module 20 scans the PMM block 46, determines where the needed module 22 is located, and either retrieves data or executes code. For example, where the secondary module 22 is a data module, the primary module 20 may retrieve a string, such as an error message, from the secondary modules 22 stored in the extended memory 34 in one embodiment. Or, where the primary module 20 needs to execute a secondary module 22 containing code, a routine call may be made to this secondary module 22 in the regular memory 30. Upon completion of its operation, the primary module 20 returns control to the BIOS 95 (block 118). After the expansion ROM 10 has been executed, the BIOS 95 deallocates the PMM block 46 as well as the other blocks holding the secondary modules 22 (block 120).

The above operations may be repeated if other expansion ROMs are found in the expansion ROM region 32, whether they be multi-module expansion ROMs, such as the expansion ROM 10 of FIG. 1, or legacy expansion ROMs (diamond 122).

In FIG. 5, a component diagram of a processor-based system is depicted. In this example, the controller is a small computer systems interface (SCSI) controller 60 including the expansion ROM 10. The SCSI controller 60 is coupled to the processor-based system by a secondary bus 58. A processor 50 and a memory 52 are coupled to one another on a primary bus 54. In between the buses 54 and 58 is a bridge chip 56. In one embodiment, the bridge chip 56 is a multi-function chip, which, in this case, includes support for the system BIOS 95.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether a device firmware program intended for storage in a designated region of a system memory exceeds the capacity of that region; and
   if so, storing said program in said region and at another location in the system memory.

2. The method of claim 1, including:
   detecting a storage device that includes the device firmware program;
   automatically determining whether the storage device includes at least two modules including a first module and one or more second modules both associated with the device firmware program; and
   if so, loading only the first module in the designated region of the system memory while copying at least one second module of the one or more second modules to the another location in the system memory when initializing a processor-based system from a system firmware program.

3. The method of claim 2, including configuring the storage device to include the first module and at least one second module using a configuration indication associated with the storage device such that the first module may be independently identifiable from the at least one second module before executing the device firmware program.

4. The method of claim 2, further including:
   in case the storage device includes only the first module, identifying the device firmware program to the system firmware program as a single code unit using the configuration indication; and
   enabling a backward compatibility for the single code unit by loading the first module at the designated region of the system memory.

5. The method of claim 4, wherein enabling the backward compatibility includes accommodating the device firmware program in the system memory by executing the first module from the designated region of the system memory in conjunction with the at least one second module at the another location in the system memory.

6. The method of claim 2, further including:
   partitioning the device firmware program into the first module and the at least one second module to avoid modifying a standard interface for communication between the device firmware program and the system firmware program; and
   enabling a platform independent initialization of the processor-based system when using said standard interface.

7. The method of claim 2, further including:
   providing an expansion read-only-memory field at the designated region of the system memory;
   providing a basic input output system in the system firmware program;
   providing at least one expansion read-only-memory for the storage device; and
   providing device driver code in the device firmware program.

8. The method of claim 2, further including:
   providing the at least one second module into the another location in the system memory based on a location indication; and
   dynamically identifying the at least one second module to the first module based on said location indication.

9. The method of claim 8, including:
   deriving the location indication from vendor-identifying information and module-specific information both associated with each second module of the one or more second modules; and
   tracking the at least one second module based on the location indication.

10. The method of claim 8, further including:
    scanning the storage device to detect a programmed option indicative of one or more expansion read-only-memories;
    scanning each expansion read-only-memory of the one or more expansion read-only-memories to determine whether the first module and the one or more second modules are indicated;
    passing control from the system firmware program to the device firmware program;
    locating the one or more second modules to initialize the processor-based system based on the one or more expansion read-only-memories; and
    returning the control to the system firmware program to boot the processor-based system.

11. A system comprising:
    a processor;
    a system memory including a designated region and another location in the system memory, said system memory coupled to the processor;
    a device firmware program intended for storage in the designated region of said system memory; and
    a system firmware program to initialize the system by utilizing said system memory, said system firmware program, upon execution:
       determines whether the device firmware program intended for storage in the designated region of the system memory exceeds the capacity of that region; and if so, stores said program in said region and at the another location in the system memory.

12. The system of claim 11, wherein the system firmware program:

detects a storage device that includes the device firmware program;

automatically determines whether the storage device includes at least two modules including a first module and one or more second modules both associated with the device firmware program; and if so, loads only the first module in the designated region of the system memory while copying at least one second module of the one or more second modules to the another location in the system memory when initializing a processor-based system from a system firmware program.

13. The system of claim 12 wherein the system firmware program configures the storage device to include the first module and at least one second module using a configuration indication associated with the storage device such that the first module may be independently identifiable from the at least one second module before executing the device firmware program.

14. The system of claim 12, wherein the system firmware program:

includes only the first module, identifying the device firmware program to the system firmware program as a single code unit using the configuration indication; and enables a backward compatibility for the single code unit by loading the first module at the designated region of the system memory.

15. The system of claim 14, wherein the system firmware program enables the backward compatibility including accommodating the device firmware program in the system memory which executes the first module from the designated region of the system memory in conjunction with the at least one second module at the another location in the system memory.

16. The system of claim 12, wherein the system firmware program:

partitions the device firmware program into the first module and the at least one second module to avoid modifying a standard interface for communication between the device firmware program and the system firmware program; and enables a platform independent initialization of the processor-based system when using said standard interface.

17. The system of claim 12, wherein the designated region in the system memory includes an expansion read-only-memory field, the system firmware program includes a basic input output system, the storage device includes at least one expansion read-only-memory, and the device firmware program includes device driver code.

18. The system of claim 12, wherein the system firmware program:

provides the at least one second module into the another location in the system memory based on a location indication; and dynamically identifies the at least one second module to the first module based on said location indication.

19. The system of claim 18, wherein the system firmware program:

derives the location indication from vendor-identifying information and module-specific information both associated with each second module of the one or more second modules; and tracks the at least one second module based on the location indication.

20. The system of claim 18, wherein the system:

scans the storage device to detect a programmed option indicative of one or more expansion read-only-memories;

scans each expansion read-only-memory of the one or more expansion read-only-memories to determine whether the first module and the one or more second modules are indicated;

passes control from the system firmware program to the device firmware program;

locates the one or more second modules to initialize the processor-based system based on the one or more expansion read-only-memories; and returns the control to the system firmware program to boot the processor-based system.

21. An article comprising a medium storing instructions that, if executed, enable a processor-based system to:

determine whether a device firmware program intended for storage in a designated region of a system memory exceeds the capacity of that region; and if so, store said program in said region and at another location in the system memory.

22. The article of claim 21 further comprising storing instructions that, if executed, enable the processor-based system to:

detect a storage device that includes the device firmware program;

automatically determine whether the storage device includes at least two modules that include a first module and one or more second modules both associated with the device firmware program; and if so, load only the first module in the designated region of the system memory while copying at least one second module of the one or more second modules to the another location in the system memory when initializing a processor-based system from a system firmware program.

23. The article of claim 21 further comprising storing instructions that, if executed, enable the processor-based system to configure the storage device to include the first module and at least one second module using a configuration indication associated with the storage device such that the first module may be independently identifiable from the at least one second module before executing the device firmware program.

24. The article of claim 21 further comprising storing instructions that, if executed, enable the processor-based system in case the storage device includes only the first module, identifying the device firmware program to the system firmware program as a single code unit using the configuration indication; and enable a backward compatibility for the single code unit by loading the first module at the designated region of the system memory.

25. The article of claim 21 further comprising storing instructions that, if executed, enable the processor-based system to enable the backward compatibility including accommodating the device firmware program in the system memory by executing the first module from the designated region of the system memory in conjunction with the at least one second module at the another location in the system memory.

26. The article of claim 21 further comprising storing instructions that, if executed, enable the processor-based system to:

provide the at least one second module into the another location in the system memory based on a location indication; and dynamically identify the at least one second module to the first module based on said location indication.

27. The article of claim 21 further comprising storing instructions that, if executed, enable the processor-based system to:

derive the location indication from vendor-identifying information and module-specific information both associated with each second module of the one or more second modules; and track the at least one second module based on the location indication.

28. The article of claim 21 further comprising storing instructions that, if executed, enable the processor-based system to:

scan the storage device to detect a programmed option indicative of one or more expansion read-only-memories;

scan each expansion read-only-memory of the one or more expansion read-only-memories to determine whether the first module and the one or more second modules are indicated;

pass control from the system firmware program to the device firmware program;

locate the one or more second modules to initialize the processor-based system based on the one or more expansion read-only-memories; and return the control to the system firmware program to boot the processor-based system.

\* \* \* \* \*